United States Patent [19]

VanBortel et al.

[11] Patent Number: 5,006,396
[45] Date of Patent: Apr. 9, 1991

[54] MOISTURE PROOF THERMALLY ACTUATED BINDING TAPE FOR BOOKS

[75] Inventors: David P. VanBortel, Walworth; John A. McNamee, Webster; Luke C. Lin, Rochester, all of N.Y.

[73] Assignee: Xerox Corporation, Stamford, Conn.

[21] Appl. No.: 223,852

[22] Filed: Jul. 25, 1988

[51] Int. Cl.$^5$ .............................. B42D 1/00; B32B 3/00
[52] U.S. Cl. ................................... 428/189; 281/21.1; 428/344; 428/347; 428/349
[58] Field of Search ............... 428/347, 349, 344, 189; 281/21.1

[56] References Cited

U.S. PATENT DOCUMENTS

| 3,437,506 | 4/1969 | Falberg | 428/347 X |
| 3,825,963 | 7/1974 | Abildgaard et al. | 11/1 R |
| 3,833,244 | 9/1974 | Heimann | 281/21.1 |
| 3,847,718 | 11/1974 | Watson | 161/39 |
| 4,244,069 | 1/1981 | Hale | 11/1 A D |
| 4,496,617 | 1/1985 | Parker | 281/21.1 X |
| 4,668,575 | 5/1987 | Schinkel et al. | 428/349 |
| 4,686,133 | 8/1987 | Nakabayashi et al. | 428/209 |
| 4,775,572 | 10/1988 | Bober et al. | 281/21.1 X |
| 4,800,110 | 1/1989 | DuCorday | 428/347 X |

Primary Examiner—Paul J. Thibodeau
Attorney, Agent, or Firm—Frederick E. McMullen

[57] ABSTRACT

A moisture proof binding tape for edge binding pages to form a book consisting of a non-permeable temperature resistant foil layer covering one side of the backing strip forming a moisture barrier, a high temperature steam resistance adhesive between the foil layer and the backing strip to secure the foil layer to the backing strip, and a relatively thick central stripe of low tack heat activated adhesive flanked by relatively thin side stripes of high tack heat activated adhesive on the foil layer.

15 Claims, 1 Drawing Sheet

MOISTURE PROOF THERMALLY ACTUATED BINDING TAPE FOR BOOKS

BACKGROUND OF THE INVENTION

1. Field of the Invention

The invention relates to a binding tape for adhesively binding pages together to form a 'Perfect Bound' book or pamphlet, and more particularly, to an improved moisture proof thermally actuated binding tape.

It is often desirable to bind pages together permanently to form a 'Perfect Bound' book, pamphlet, or the like. While numerous arrangements for doing this are known and available, one well known and popular method is to use an adhesive bearing binding strip or tape which when attached to the edge or spine of the assembled pages, binds the pages and the tape together to form the book. Binding tapes of this type typically employ either heat activated adhesive or a pressure sensitive adhesive, or combination thereof. The adhesive formulations used are many and varied.

Binding tapes employing heat activated adhesives generally use a heavy paper stock for the tape substrate or backing strip. However, paper has an inherent disadvantage in that paper is largely made up of cellulose fibers which are hygroscopic. When heated to activate the adhesive(s), any water in the paper is also heated, and since the binding temperatures typically used are normally above the boiling point of water, any water in the backing strip will be turned into steam.

Water is undesirable from at least two standpoints. First, the water imposes an additional thermal load during the binding process, especially during the period when the water changes from liquid to gas. Secondly, the steam produced from the water has a deleterious effect on the adhesive used. In the case of the latter, when the water reaches the boiling point and is converted into steam, the steam that results will try to exit the binding strip. Since escape from the non-adhesive bearing side of the backing strip is normally blocked or seriously impeded by the binding apparatus itself, the steam must escape at the interface between the strip and the adhesive. If the viscosity of the adhesive is low enough, the steam will bubble through the adhesive and escape to the atmosphere via this route. This bubbling however causes the viscosity of the adhesive to be mechanically lowered, changing the adhesive's properties and binding performance.

If the viscosity of the adhesive is high, release of the steam from the binding strip is inhibited until the adhesive reaches a viscosity where the steam can penetrate it. The steam is usually in the form of small bubbles of a size that is probably determined by the fiber structure of the paper. But, as the steam enters the adhesive, it collects and forms larger and larger bubbles. These larger bubbles are forced upwards by the pressure below and the effect of gravity, and as the bubbles rise, they lift the layer of adhesive above them. This changes the heat transfer relation from the more efficient conduction through the adhesive to the less efficient convection through the steam bubbles. This causes premature cooling and thickening of the adhesive, trapping the steam permanently inside the matrix of the book.

Where binding takes place in moderate humidity conditions, there typically results undesirable and unsightly 'bumps' in the spine of the book. On the other hand, where binding takes place in high humidity conditions, the binding may not take, resulting in separation of the backing strip from the spine of the book, either immediately after binding or at some later point in time.

2. Description of the Related Art

In the prior art, U.S. Pat. No. 3,847,718 to Watson, which is incorporated by reference herein, discloses a binding means employing a relatively thick central binding stripe of low tack heat activated adhesive on a substrate such as paper flanked by relatively thin side stripes of high tack heat activated adhesive. A related patent, U.S. Pat. No. 4,244,069 to Hale, discloses a binding material in which the substrate comprises a heat shrinkable plastic covered with a pressure sensitive adhesive bearing a relatively thick heat activated adhesive stripe along the center thereof. U.S. Pat. No. 3,825,963 to Abildgaard et al discloses a combined mechanical/adhesive binding apparatus in which rivets or studs are used along with a binding tape to make books, the binding tape using a pressure sensitive adhesive to attach the tape to the spine of the book. And, U.S. Pat. No. 4,686,133 to Nakabayashi et al, discloses a material for sealing the mouths of glass containers in which a metal foil with a thermal adhesive layer bonded thereto by a polyester-isocyanate type two component adhesive is employed.

SUMMARY OF THE INVENTION

In contrast to the prior art referred to above, the present invention is concerned with the problem of moisture and the deleterious effect that such moisture has on the effectiveness of the binding that is made, the present invention providing a binding tape for use in binding the pages together to form a 'Perfect Bound' book, the tape comprising a backing strip with at least one stripe of hot melt adhesive on the tape, application of heat to the tape actuating the adhesive to form a bond between the tape and the book spine, and moisture transfer preventing means to prevent transfer of moisture from the backing strip to the adhesive stripe on application of heat to the tape, the moisture preventing means comprising a layer of non-permeable temperature resistant barrier material between the backing strip and the adhesive stripe.

DESCRIPTION OF THE PREFERRED EMBODIMENTS

Figure 1:
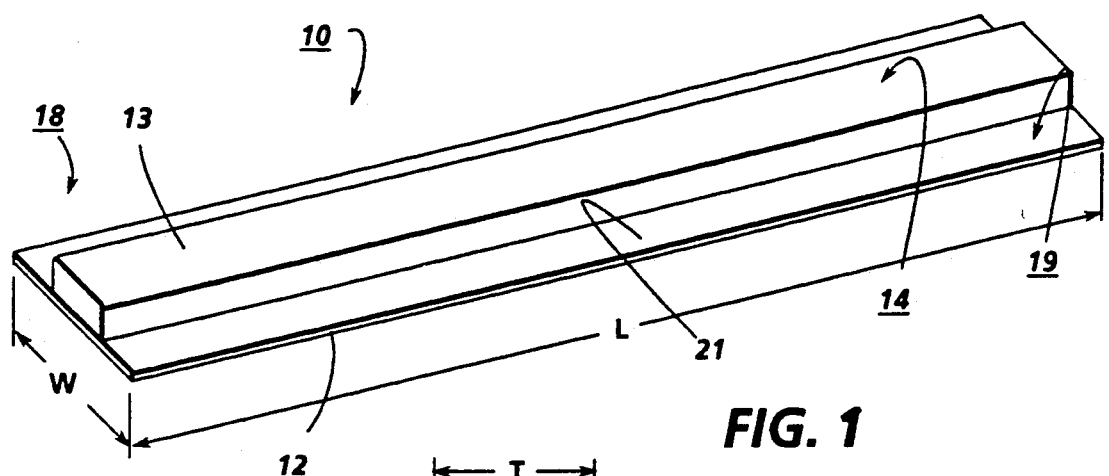
FIG. 1 is an isometric view showing the moisture proof binding tape of the present invention.
Figure 2:
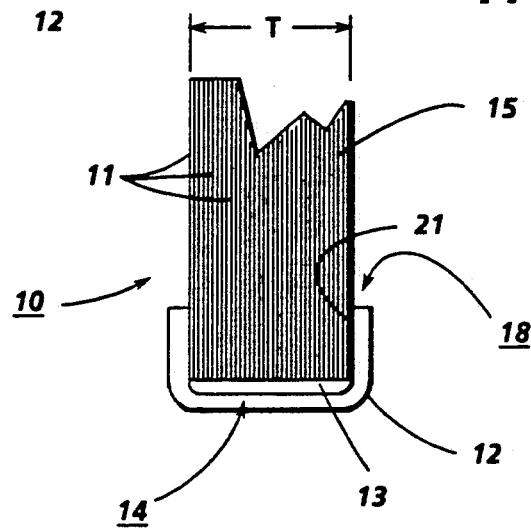
FIG. 2 is a cross sectional view of the binding tape shown in FIG. 1 applied to a book.
Figure 3:
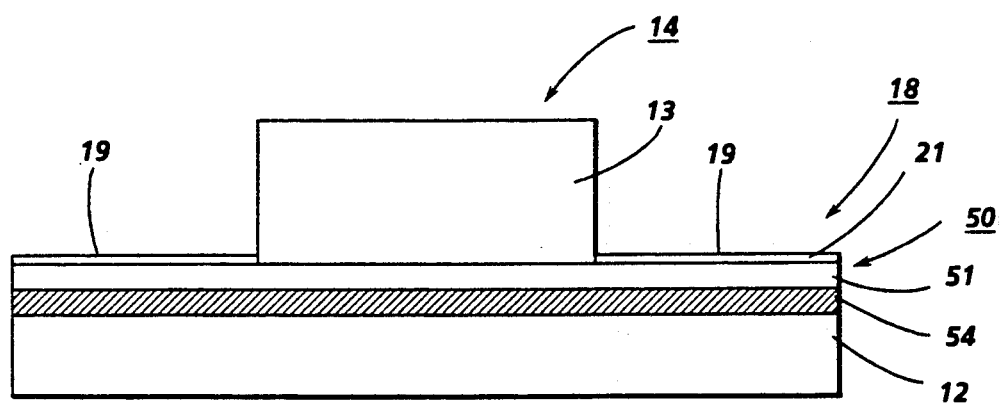
FIG. 3 is a cross sectional view of the binding tape shown in FIG. 1 illustrating details of the tape moisture barrier.

Referring to the drawings, numeral 10 designates generally the moisture proof binding tape of the present invention. In the exemplary arrangement shown, tape 10 comprises a length or strip 12 of formable backing or substrate material consisting of relatively heavy paper stock bearing heat activated adhesive coatings with a moisture barrier between the backing and the adhesives. Typically, tape 10 is in the form of a roll (not shown) that is cut to desired length at the time of use. Normally, the length L to which tape 10 is cut when binding is substantially equal to the length of the pages 11 of the book 15 being bound although other lengths may be contemplated. The width W of the backing strip 12 is somewhat greater than thickness T of book 15 to allow the sides or flanks 18 of tape 10 to partially wrap around and be secured to the outer pages or covers of the assembled book 15 as will appear. Binding strip 12 may be of any desired thickness.

Backing strip 12 has a central elongated stripe 14 of high tack heat activated adhesive 13 along the centerline thereof. Adhesive stripe 14 is relatively thick, a thickness of from 0.020 to 0.022 inches, for example, having been found to be suitable. The width of adhesive stripe 14 is less than the width W of backing strip 12 and approximates or is slightly greater than the thickness of the assembled pages 11 that when bound together form book 15. As a result, sides 18 of strip 12 extend along each side of stripe 14.

Sides 18 of backing strip 12 bear a relatively thin coating or layer of low tack heat activated adhesive 21. As a result, there is provided a stripe 19 of low tack heat activated adhesive 21 on each side of the central stripe 14 of high tack heat activated adhesive. The layer of adhesive 21 on sides 18 has a thickness of 0.0016 to 0.0020 inches.

A high tack adhesive such as adhesive 13 comprises an adhesive material or formulation which when heated remains highly viscous and somewhat immobile so that a definite amount of pressure and/or heat is necessary to wet-out the surface being adhered. A low tack adhesive such as adhesive 21 comprises an adhesive material or formulation which when heated becomes fairly molten or fluid thereby providing a high degree of surface wet-out with minimum application of pressure or heat.

In binding systems, and particularly in binding systems which comprise an integral part of a book making machine, such as the Xerox 5090 (Xerox and 5090 are registered Trademarks of Xerox Corporation, Stamford, Conn.), high speed binding is essential if high machine throughputs are to be achieved. To effect this and maintain the binding cycle as short as possible, relatively high binding temperatures on the order of 425° F. are used.

However, the paper that is used for backing strip 12 is largely made up of cellulose fibers which are hygroscopic. As a result, when backing strip 12 is heated during the binding process to activate the adhesives, water present in the paper is also heated. When the water reaches the boiling point, steam is formed which will try to escape from the backing strip. At the interface between the backing strip and the adhesives, if the viscosity of the adhesive is low enough, the steam will bubble through the adhesive and escape to the atmosphere. Such bubbling causes the viscosity of the adhesive to be mechanically lowered, changing the adhesive properties and the binding performance achieved.

When the viscosity of the adhesive is high, release of the steam from the paper will be inhibited until the adhesive reaches a viscosity where the steam is able to penetrate the adhesive. The steam usually enters the adhesive in the form of small bubbles, the size of which is probably determined by the fiber structure of the paper used for the backing strip. As the steam enters the adhesive, the steam will collect to form larger and larger bubbles. As these bubbles are forced upwards by the pressure below and the effect of gravity, the bubbles lift the adhesive layer, allowing the layer of adhesive above to cool as a result of the change in heat transfer mode from conduction through the adhesive to convection through the steam bubbles. The raised adhesive quickly cools and thickens, thus trapping the steam permanently within the binding. The result can be a poor quality binding with 'bumps' and roughness evidenced along the spine. Or, where binding is performed in an environment where the humidity is high, complete separation of the binding tape from the pages that comprise the book can occur.

The effect of the foregoing is dependent upon the amount of water in the backing paper which in turn is dependent principally upon the type and thickness of the paper and the relative humidity in the environment that the binding tape is exposed to. It can be understood that at relatively low (e.g. 20%) relative humidity, the effect of steam is relatively small, whereas at relatively high (e.g. 80%) relative humidity levels, total failure of the binding can occur.

In order to prevent binding degradation and failure as a result of moisture, a moisture barrier 50 is provided between backing strip 12 and the adhesives 13, 21. Moisture barrier 50 comprises a non-permeable, temperature resistant layer 51 placed between backing strip 12 and adhesives 13, 21. Layer 51 preferably comprises an aluminum foil, which may be of standard commercial thickness (i.e., 0.00035 inches) or a polyester film of about 0.0005 to 0.001 inches thickness. Other thickness foil and polyester film may, however, be envisioned as well as other suitable temperature resistant non-permeable materials such as fluorinated polymers, silicones, and the like.

To retain layer 51 in place on backing strip 12, a suitable high temperature steam resistant adhesive 54 is used. Preferable adhesive materials for this purpose comprise Latex adhesives. Other suitable high temperature steam resistant adhesives such as thermo-setting adhesives may, however, be used.

In use, the loose pages comprising the book are placed, spine edge first on binding tape 10. Sides 18 are turned upwardly to bring the adhesive 21 into contact with the outside pages or covers of the book 15. Heat and pressure may then be applied, either simultaneously or in stages, to the bottom and sides of strip 12 to activate, i.e., melt, the adhesives 13, 21 and bind the pages of book 15 to one another and to strip 12.

The application of heat and pressure to the bottom of strip 12 activates the adhesive 13, the relatively large quantity of adhesive that comprises stripe 14 flowing or wicking between and among the edges of the book pages and being absorbed intimately therewith to bond the pages together to one another and to strip 12. The application of heat and pressure to sides 18 of strip 12 activates the adhesive 21 to establish a tight bond between the sides 18 of strip 12 and the outer pages or covers of book 15. This prevents sides 18 from unfolding away from the outer pages or covers of book 15 when the source of heat and pressure is removed and the binding is completed.

Any steam generated as a result of moisture in backing strip 12 is prevented from passing into the adhesives 13, 21 by the moisture barrier 50, and instead remains trapped within the backing strip.

In one embodiment, backing strip 12 consisted of an Acrylic Latex treated paper (AB617, Speciality Paper Board Co., Beaver Falls, N.Y.) of approximately 0.006 inches thickness with heat activated adhesive 13 comprising a polyamide material (Macromelt TM, Henkel Adhesives Co., Minneapolis, Minn.) and adhesive 21 comprising a EVA material (Flex-Back 34-1077, National Starch and Chemical Corp., Ridgewater, N.J.). The thickness of adhesive 13 was 0.022 inches while that of adhesive 21 was 0.0020 inches. Layer 50 was formed from an aluminum foil of 0.00035 inches thick with adhesive 54 comprising a Casein-Neoprene adhesive.

Other binding tape configurations and assemblies may be contemplated. For example, adhesive 13 may instead comprise a suitable low tack adhesive while adhesive 21 comprises a suitable high tack adhesive. Further, the layer of adhesive 21 may extend over the entire surface of backing strip 21 and between foil layer 51 and adhesive 13. Stripe 14 may, instead of being continuous, comprise a series of discrete adhesive formations or blocks. And while adhesive stripe 14 is described and shown as being thicker than side stripes 19 of adhesive 21, the adhesive stripes 14, 19 may be substantially the same thickness. Further, the various substrate, adhesive, and moisture barrier thicknesses provided herein are understood to be examples only and the present invention is not intended or to be construed as limited to the specific dimensions and dimensional ranges described.

While the invention has been described with reference to the structure disclosed, it is not confined to the details set forth, but is intended to cover such modifications or changes as may come within the scope of the following claims.

We claim:

1. A binding tape for application to the spine of a book to bind the pages of said book together, comprising the combination of:
    a backing strip composed of a hygroscopic material;
    at least one stripe of hot melt adhesive on said backing strip, said at least one stripe of hot melt adhesive being narrower than said backing strip; and
    moisture transfer preventing means to prevent transfer of moisture in the form of steam from said backing strip to said stripe of hot melt adhesive on application of heat to said tape,
    said moisture preventing means comprising a layer of non-permeable temperature resistant barrier material between said backing strip and said stripe of hot melt adhesive.

2. The binding tape according to claim 1 in which said barrier material comprises a metal foil.

3. The binding tape according to claim 1 in which said barrier material comprises a polyester film.

4. The binding tape according to claim 2 including a steam resistant layer of adhesive between said backing strip and said foil to retain said foil in place on said backing strip.

5. The binding tape according to claim 3 including a steam resistant layer of adhesive between said backing strip and said film to retain said film in place on said backing strip.

6. Means for edge binding pages together in book fashion comprising:
    a substrate of formable material, said substrate having a minimum width greater than the thickness of the book to be bound to permit said substrate to overlay not only the book end but also at least that portion of the outer pages of said book immediately adjoining said book end;
    a first heat activated high tack adhesive on one face of said substrate and substantially along the centerline thereof, said first adhesive being smaller in size that said substrate and arranged in a generally longitudinal stripe formation having opposing sides, such that uncovered portions of said substrate project therebeyond at least along the sides of said first adhesive stripe;
    said first adhesive stripe being of a width sufficient to accommodate the thickness of the pages to be bound;
    a second adhesive on said substrate uncovered portions at least along each side of said first adhesive stripe whereby to form a pair of second adhesive stripe formations flanking said first adhesive stripe, said second adhesive consisting of a low tack heat activated adhesive,
    said first adhesive being relatively thicker than said second adhesive; and
    a layer of non-permeable moisture resistant material between said substrate and said first and second adhesives to prevent transfer of moisture in the form of steam from said substrate to said first and second adhesives when said first and second adhesives are heated to actuate said first and second adhesives to a binding condition.

7. The means according to claim 6 in which said layer of moisture resistant material comprises a moisture impenetrable metal layer.

8. The means according to claim 6 in which said layer of moisture resistant material comprises a moisture impenetrable plastic layer.

9. The binding tape according to claim 7 including a steam resistant layer of adhesive between said substrate and said metal to retain said metal layer in place on said substrate.

10. The binding tape according to claim 8 including a steam resistant layer of adhesive between said substrate and said plastic to retain said plastic layer in place on said substrate.

11. Means for edge binding pages together in book fashion comprising:
    a substrate of formable material, said substrate having a minimum width greater than the thickness of the book to be bound to permit said substrate to overlay not only the book end but also at least that portion of the outer pages of said book immediately adjoining said book end;
    a first heat activated low tack adhesive on one face of said substrate and substantially along the centerline thereof, said first adhesive being smaller in size than said substrate and arranged in a generally longitudinal stripe formation having opposing sides, such that uncovered portions of said substrate project therebeyond at least along the sides of said first adhesive stripe;
    said first adhesive stripe being of a width sufficient to accommodate the thickness of the pages to be bound;
    a second adhesive on said substrate uncovered portions at least along each side of said first adhesive stripe whereby to form a pair of second adhesive stripe formations flanking said first adhesive stripe, said second adhesive consisting of a high tack heat activated adhesive;
    said first stripe being relatively thicker than said second stripe; and
    a layer of non-permeable moisture resistant material between said substrate and said first and second adhesives to prevent transfer of moisture in the form of steam from said substrate to said first and second adhesives when said first and second adhesives are heated to actuate said first and second adhesives to a binding condition.

12. A moisture proof thermally activated binding tape for use in binding pages together to form a book, comprising in combination:
  (a) a backing strip, said backing strip being composed of paper;
  (b) a first stripe of heat activated adhesive on said tape, said first adhesive stripe extending longitudinally of said backing strip substantially along the center thereof, said first adhesive stripe having a width less than the width of said backing strip whereby side portions of said backing strip extend along each side of said first adhesive stripe;
  (c) a second stripe of heat activated adhesive on said side portions, said first stripe being relatively thicker than said second stripe; and
  (d) a moisture barrier layer between said backing strip and said first and second adhesive stripes to prevent the egress of moisture from said backing strip to said first and second adhesive stripes when said binding tape is thermally activated,
  said moisture barrier layer being relatively thinner than said backing strip and said first and second adhesive stripes.

13. The binding tape according to claim 12 in which said moisture barrier layer comprises a metal foil.

14. The binding tape according to claim 12 in which said moisture barrier layer comprises a plastic.

15. The binding tape according to claim 12 including a moisture resistant layer of adhesive between said backing strip and said moisture barrier layer.

* * * * *